Patented Feb. 4, 1936

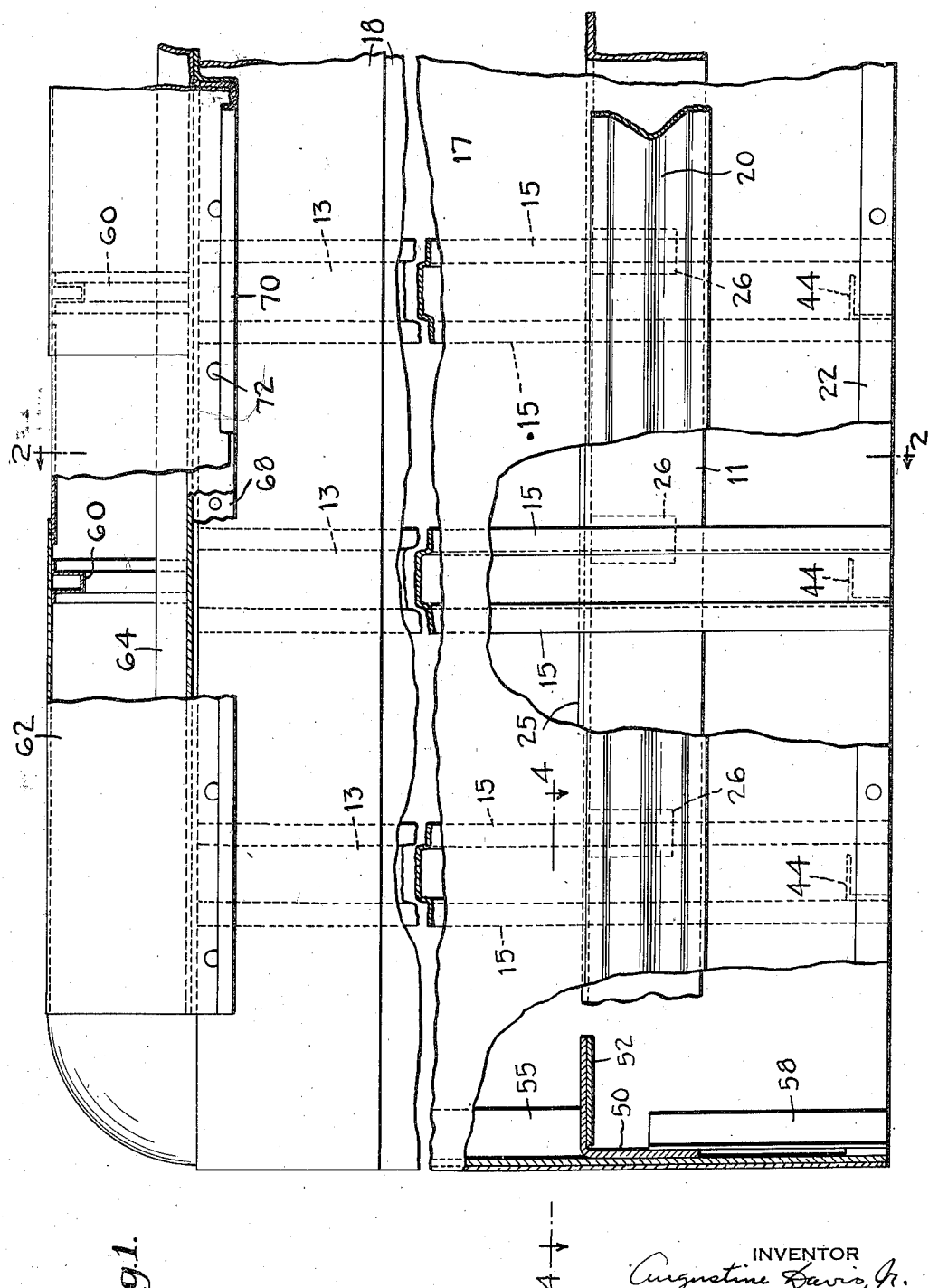

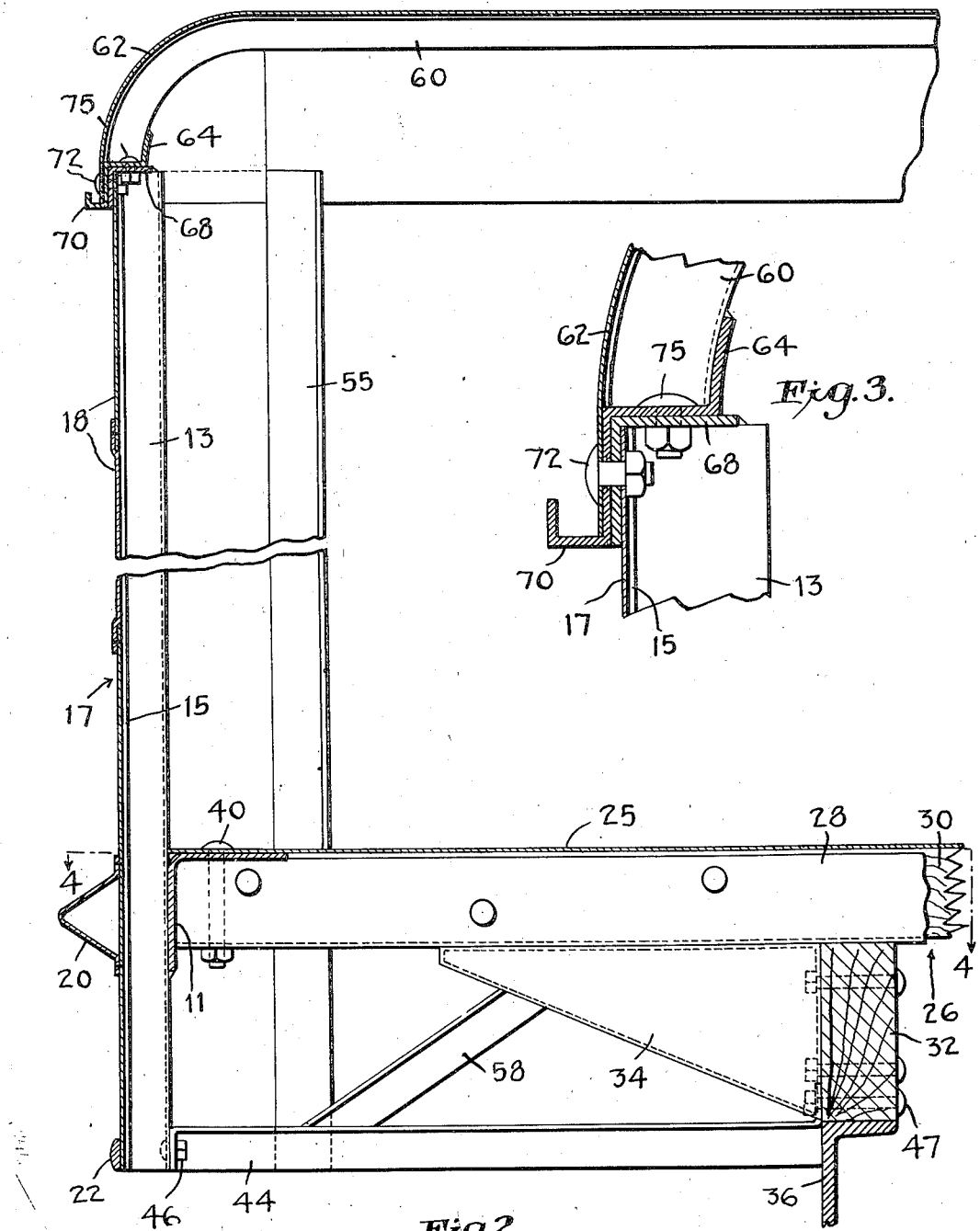

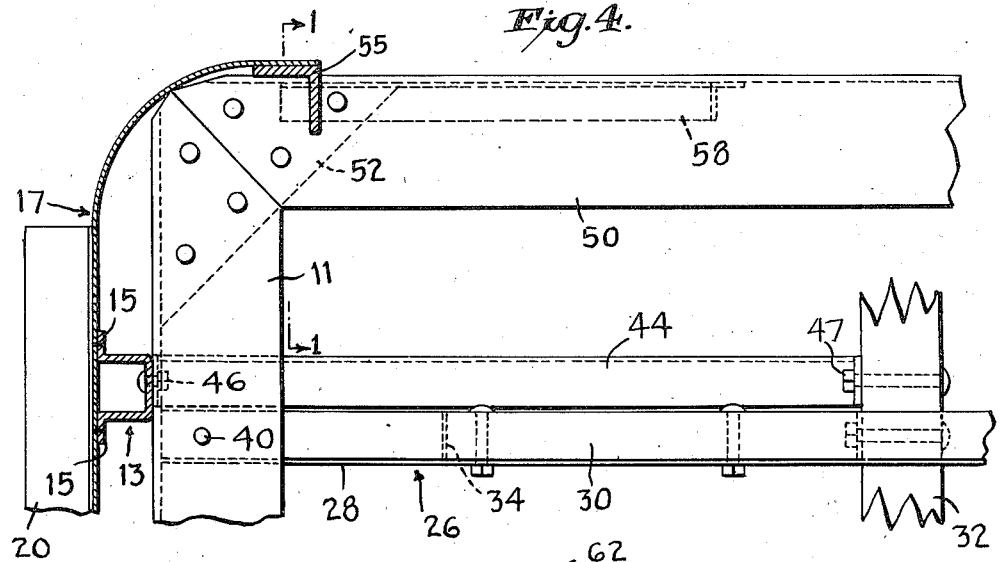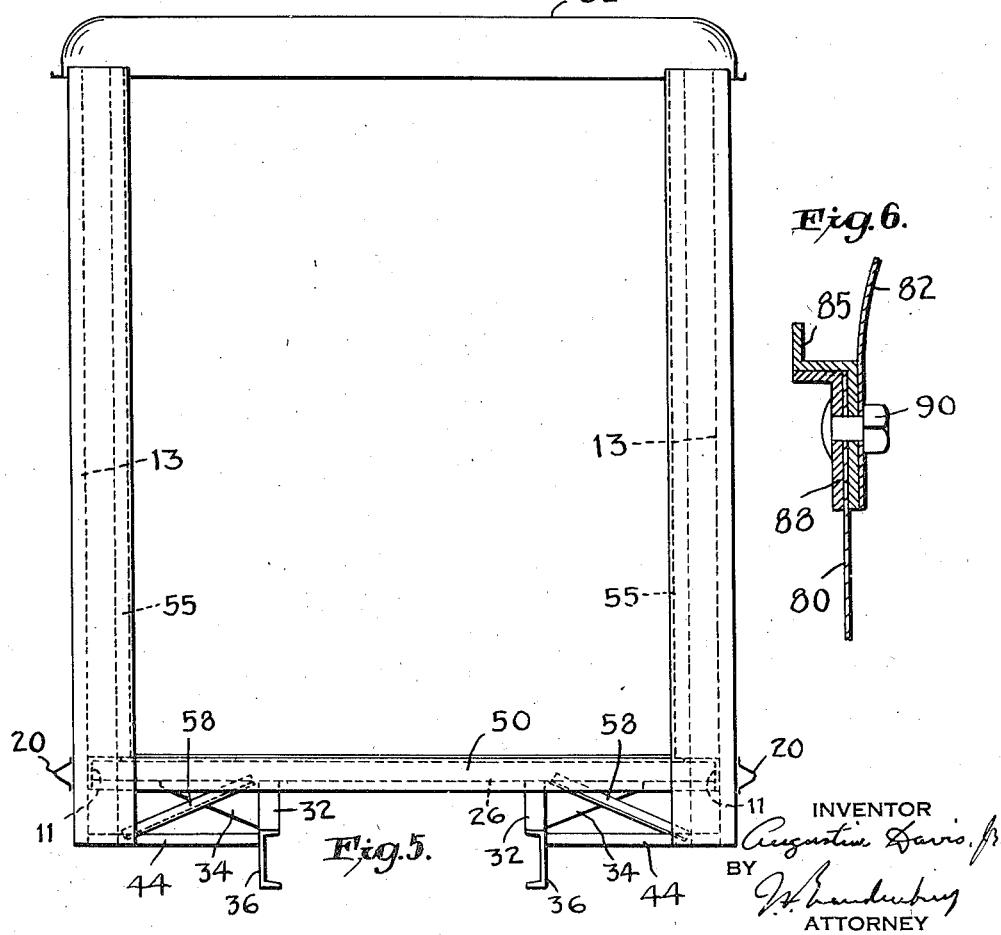

2,029,756

UNITED STATES PATENT OFFICE 2,029,756

VEHICLE BODY

Augustine Davis, Jr., Cincinnati, Ohio

Application January 26, 1933, Serial No. 653,628

5 Claims. (Cl. 296—28)

This invention relates to vehicle bodies for motor trucks or trailers.

It is an object of the invention to provide an improved vehicle body construction having novel features and combinations of elements that produce a strong body of light weight and a construction that requires no careful fitting and can therefore be assembled with speed and economy.

Another object of the invention is to provide a roof construction having ceiling carlines curved at their ends to meet the upright side posts, and supporting a roof of sheet material which curves downward with the ends of the ceiling carlines and overlaps a side panel supported by the posts. The roof or side panel may be of aluminum or other material spot welded to carlines or posts of suitable material.

Another object is to provide a vehicle body construction having upwardly extending posts with a side panel of sheet metal secured to the posts by spot welding, and to construct such a body in separate units such as a floor deck unit, a side and end wall unit for each side of the body, and a roof unit, so that a side panel can be spot welded to each side and end wall unit, and a roof panel spot welded to the roof unit before the units are assembled into a complete body. This construction not only makes it convenient and practical to spot weld the panels, but the welded units can be shipped before assembly and connected together at their destination. Shipping the body in this "knocked-down" condition effects a substantial saving in freight.

In the accompanying drawings, forming a part hereof:

Fig. 1 is a fragmentary side elevation, partly in section, of a vehicle body made in accordance with the invention. The section at the lower left-hand corner of this view is taken on the line 1—1 of Fig. 4.

Fig. 2 is a sectional view taken on the line 2—2 of Fig. 1.

Fig. 3 is an enlarged detail view showing the connection of the roof and side of the vehicle body illustrated in Fig. 2.

Fig. 4 is a sectional view taken on the line 4—4 of Fig. 1.

Fig. 5 is a front view, on a reduced scale, of the vehicle body shown in the preceding figures.

Fig. 6 is a detail sectional view, similar to Fig. 3, showing a modified construction for connecting the roof and side.

A longitudinal angle member 11 extends along the length of the body, and a plurality of upright carlines or posts 13 are secured to the angle member at spaced points along its length, as shown in Fig. 1. These posts 13 may be secured to the longitudinal angle member 11 by bolts, or welding, or other fastening means.

The posts 13 are of channel cross-section (Fig. 4) and have the edges of the open side of the channel bent outwardly to provide flanges 15 for contact with an outside panel 17. This outside panel is made of smaller sections 18 welded together by overlapping and spot welding, or by spot welding smaller sections to a splice plate. The panel 17 is preferably spot welded to the posts 13. Other types of outside panels can be used and fastened to the posts in any desired manner.

A scuff rail 20 is connected to the outside of the side wall, preferably by spot welding, and a molding 22 is secured to the side wall adjacent the bottom edge. When the body is built for shipment in a knocked-down condition, the side wall, with the longitudinal angle member 11 attached, constitutes one of the units.

Fig. 2 shows the connection of the side wall to the floor deck of the body. The floor deck 25 comprises a floor 25 supported on bolsters 26. The bolster 26 is of composite construction, with a metal angle 28 extending down one side and across the bottom of a wooden beam 30. Other kinds of bolsters can be used with this invention.

The bolster 26 rests on sills 32 and has braces 34 connected to the outside faces of the sills. The braces and sills for both sides of the body are shown in Fig. 5. The sills 32 are supported by longitudinal frame members 36 of a truck chassis. When connecting the body to a trailer, the sills 32 are ordinarily the longitudinal members of the trailer frame.

One face of the angle 11 contacts with the inside faces of the posts, and the inwardly extending leg of the angle 11 rests on top of the bolsters 26 (Fig. 2) and is secured to each bolster by a bolt 40. These bolts hold the side wall unit and floor deck in assembled relation. The longitudinal angle 11 is connected to the posts some distance above the lower ends of these posts. The posts are connected outside of the longitudinal angle 11 and extend below this angle so that no accurate fitting is required in connecting the posts to the longitudinal angle.

Each post 13 extends substantially to the lower edge of the outside panel 17. Thus the posts hold the portions of the side panel both above and below the level of the floor so that the side panel can be extended down to form the skirting of the body. A very strong construction is obtained by connecting a brace 44 between the sill 32 and the lower end of each post 13. A bolt 46 connects the brace 44 with the post 13 and a bolt 47 connects the other end of the brace 44 to the sill 32. Other fastening means can be used, and the brace can be connected to other parts of the frame or floor deck.

At the front end of the body a transverse angle member 50, shown in Figs. 1 and 4, extends between the longitudinal angle members. A gusset plate 52 connects the transverse angle 50 and the longitudinal angle member 11. The side panel is curved to form a rounded corner and short end wall at the front of the body, and the end of the side panel is connected, preferably by spot welding, to an upright angle 55. This same construction can be used at both ends of the body.

The leg of the upright angle 55 which contacts with the panel 17 extends substantially the entire height of the panel, but the other leg of this upright angle is cut off at the top of the transverse angle 50, and the end of this leg rests on the top face of the transverse angle and is connected to the angle by welding.

The lower end of the upright angle 55 is connected to one end of a brace 58 and the other end of the brace is connected to the transverse angle 50, though the upright angle can be braced in the same way as the posts if desired.

Ceiling carlines 60 are of lighter construction than the upright carlines or posts 13, and the end of each ceiling carline is curved downward to meet one of the posts 13, as shown in Fig. 2. The end of each ceiling carline 60 is welded or otherwise connected to a drip moulding 64.

The ceiling carlines 60 are covered by roof material comprising a sheet or panel 62, preferably of sheet metal and spot welded to the ceiling carlines. The roof panel follows the curve of the ends of the ceiling carlines but extends beyond the ends of the ceiling carlines and overlaps the drip moulding 64. When the body is made for shipment, knocked-down, the roof is one of the units, the panel 62 and drip moulding 64 being connected to the ceiling carlines 60 at the factory.

The connection of the roof to the side wall is shown on an enlarged scale in Fig. 3. An angle 68 is connected to the top end of each upright 13 by welding or other fastening means. Bolts 72 hold the drip moulding 64 and panels 62 and 17 against the downwardly extending leg of the angle 68. The drip moulding 64 is connected to the angle 68 by bolts 75 and 72.

Fig. 6 shows a modified construction for connecting the roof to the side of the body. In this construction a side panel 80 extends a short distance above the end of the post 13. The ceiling carline 60 is covered by a roof panel 82. There is no direct connection between the post 13 and the ceiling carline 60, but the roof and side of the body are connected by the overlapping edges of the panels 80 and 82. A drip moulding 85 has a downwardly extending portion clamped between the overlapping edges of the panels 80 and 82. An angle moulding 88 fits under the drip moulding and against the outside of the side panel 80. Bolts 90 extend through the angle moulding 88, side panel 80, drip moulding 85, and roof panel 82, and fasten these parts together.

Other modifications of the invention can be made, and various features can be used alone or in combination with other features, without departing from the invention.

I claim:

1. In a truck or trailer body of the type having a panel on each side, a plurality of longitudinally spaced upright posts supporting each panel, a longitudinally extending frame with which the posts of each panel are connected at their upper ends, and a longitudinal angle member for connecting with the posts to support them from the bolsters of the truck or trailer, a construction including posts in contact with the outside face of the angle member and extending below the angle member by which they are connected with the bolsters so that a substantial manufacturing tolerance in the length of the posts is permissible and no accurate fitting of the posts required during assembly, welded connections between the posts and angle member for fastening the posts to the angle member without locating and registering openings for fastenings or securing fastening means, and a panel against the outside faces of the posts, secured to the posts and extending with said posts below said angle member so that said panel forms both the side wall and skirting of the body.

2. In a vehicle body of the type having side wall panels supported by upright posts at spaced points along the length of the side wall panels, a plurality of transversely extending bolsters for supporting the body on a truck or trailer, an angle member extending longitudinally along the ends of the bolsters, detachable fastening means connecting the angle member with the respective bolsters, a plurality of upwardly extending posts permanently connected to the angle member at spaced points along its length, a roof deck with which the posts are connected at their upper ends, said posts being connected with the angle member at points intermediate their ends and on the outside of the angle member so that they extend below the angle member and ends of the bolsters to form a support for skirting on the body.

3. A truck or trailer body comprising a floor deck having spaced, parallel, transverse bolsters for supporting the body from the longitudinal sill or frame of a truck or trailer, a longitudinally extending angle connected to the ends of said bolsters and disposed with the outside face of one leg beyond the ends of the bolsters and lying in a substantially vertical plane, fastening means connecting the angle with the bolsters, a plurality of upwardly extending posts contacting with the outside vertical face of the angle at points intermediate their ends and connected with said angle, a roof deck with which the posts connect at their upper ends, a side panel connected with the posts and bracing said posts in a longitudinal plane, and means for bracing the posts in a transverse plane including braces connected at opposite ends with the lower ends of the upright posts and the longitudinal sill or frame of the truck or trailer.

4. An automotive vehicle body comprising a floor deck including transverse bolsters, a longitudinal member extending across the ends of the bolsters, detachable fastening means removably connecting the longitudinal member with the ends of the bolsters, a plurality of posts outside of said longitudinal member and secured to said member intermediate their ends so that the posts are continuous above and below the longitudinal member, and a side panel outside of the posts and extending with said posts above and below the longitudinal member, said panel being secured to the posts and forming with said posts and longitudinal member a complete and continuous structural unit which comprises both the side wall and skirting of the body.

5. An automotive vehicle body comprising a floor deck including bolsters extending transversely from longitudinal supporting sills of a truck or trailer, a single longitudinal angle extending along the ends of the bolsters, detachable fastening means removably connecting the angle to the respective bolsters, upright posts secured to the outside face of the angle, each post extending both upward and downward from the angle, a sheet metal panel outside of the posts and substantially coextensive with the vertical length of said posts to form with the posts and angle a detachable side unit which comprises both the side wall and skirting of the body in a continuous structure, and detachable fastening means at the top of the side wall unit for connecting the side unit with a roof unit.

AUGUSTINE DAVIS, Jr.